US011541497B2

(12) United States Patent
Wu

(10) Patent No.: US 11,541,497 B2
(45) Date of Patent: Jan. 3, 2023

(54) COMBINED ELECTRIC TOOL COORDINATION SYSTEM AND METHOD

(71) Applicant: SUZHOU CLEVA ELECTRIC APPLIANCE CO., LTD., Suzhou (CN)

(72) Inventor: Fufei Wu, Jiangsu (CN)

(73) Assignee: SUZHOU CLEVA ELECTRIC APPLIANCE CO., LTD, Suzhou (CN)

( * ) Notice: Subject to any disclaimer, the term of this patent is extended or adjusted under 35 U.S.C. 154(b) by 815 days.

(21) Appl. No.: 15/531,097

(22) PCT Filed: Nov. 18, 2015

(86) PCT No.: PCT/CN2015/094868
§ 371 (c)(1),
(2) Date: Oct. 11, 2018

(87) PCT Pub. No.: WO2016/082702
PCT Pub. Date: Jun. 2, 2016

(65) Prior Publication Data
US 2019/0030669 A1 Jan. 31, 2019

(30) Foreign Application Priority Data
Nov. 28, 2014 (CN) .......................... 201410699819.1

(51) Int. Cl.
*B23Q 11/00* (2006.01)
*G05B 19/042* (2006.01)
(Continued)

(52) U.S. Cl.
CPC ...... *B23Q 11/0046* (2013.01); *B23Q 11/0071* (2013.01); *B23Q 15/12* (2013.01);
(Continued)

(58) Field of Classification Search
CPC ............ B23Q 11/0046; B23Q 11/0071; B23Q 15/12; G05B 19/0426; G05B 2219/45058; B24B 49/16; B24B 55/06; B24B 55/107
(Continued)

(56) References Cited

U.S. PATENT DOCUMENTS

| 4,905,420 A | 3/1990 | Fein |
| 6,222,285 B1 * | 4/2001 | Haley .................... H02P 25/14 307/38 |

(Continued)

FOREIGN PATENT DOCUMENTS

| CN | 201579677 U | 9/2010 |
| CN | 202895000 U | 4/2013 |

(Continued)

OTHER PUBLICATIONS

International Search Report for PCT/CN2015/094868, dated Jan. 5, 2016.

*Primary Examiner* — Michelle Lopez
(74) *Attorney, Agent, or Firm* — JK Intellectual Property Law, PA

(57) ABSTRACT

A combined electric tool coordination system includes a main tool (4) and an auxiliary tool (1). The main tool (4) and the auxiliary tool (1) coordinate for working. A load detection module (E1) is used to detect a load parameter that is generated when the main tool (4) operates, and send the load parameter to a central control module (E2). The central control module (E2) adjusts output power of the auxiliary tool (1). The central control module (E2) controls power of the auxiliary tool (1) to increase as the load parameter of the main tool (4) increases and decrease as the load parameter decreases. An automatic adjustment function of the auxiliary tool (1) is applied to a dust collector (1). When power of the main tool (4) increases, more dust and scraps are generated, suction of the dust collector (1) is automatically adjusted to
(Continued)

be higher, and the demand of a large quantity of dust is satisfied; and when the power of the main tool (4) decreases, less dust and scraps are generated, power of the dust collector (1) automatically decreases, the suction is reduced, and the demand of a small quantity of dust is satisfied.

7 Claims, 7 Drawing Sheets

(51) Int. Cl.
  *B23Q 15/12* (2006.01)
  *B24B 55/06* (2006.01)
  *B24B 49/16* (2006.01)
  *B24B 55/10* (2006.01)

(52) U.S. Cl.
  CPC .......... *G05B 19/0426* (2013.01); *B24B 49/16* (2013.01); *B24B 55/06* (2013.01); *B24B 55/107* (2013.01); *G05B 2219/45058* (2013.01)

(58) Field of Classification Search
  USPC .............................................................. 173/3
  See application file for complete search history.

(56) References Cited

U.S. PATENT DOCUMENTS

| | | | | |
|---|---|---|---|---|
| 7,296,323 | B2* | 11/2007 | Hayama | A47L 7/0085 |
| | | | | 15/327.6 |
| 7,966,691 | B2* | 6/2011 | Takahashi | A47L 9/19 |
| | | | | 15/339 |
| 2002/0129949 | A1* | 9/2002 | Bongers-Ambrosius | |
| | | | | B23Q 1/0009 |
| | | | | 173/217 |
| 2004/0060145 | A1* | 4/2004 | Hayama | A47L 9/2894 |
| | | | | 15/339 |
| 2004/0093682 | A1* | 5/2004 | Litomisky | B23Q 11/0046 |
| | | | | 15/314 |
| 2010/0199453 | A1* | 8/2010 | Brotto | A47L 9/2894 |
| | | | | 15/301 |
| 2012/0073077 | A1* | 3/2012 | Ishikawa | A47L 9/2842 |
| | | | | 15/347 |

FOREIGN PATENT DOCUMENTS

| | | |
|---|---|---|
| CN | 204241870 U | 4/2015 |
| CN | 204679773 U | 9/2015 |
| WO | 2008033973 | 3/2008 |

* cited by examiner

COMBINED ELECTRIC TOOL COORDINATION SYSTEM AND METHOD

CROSS REFERENCE TO RELATED APPLICATIONS

This application is a national stage of International Application No. PCT/CN2015/094868, filed Nov. 18, 2015, and claims benefit to Chinese Patent Application No. 201410699819.1 filed Nov. 28, 2014, both of which are incorporated by reference herein.

TECHNICAL FIELD

The present disclosure relates to an electric tool coordination system and the coordination method used by the electric tool coordination system.

BACKGROUND

Multiple electric tools need to coordinate for working together to complete a task during operation, for example, a dust collector to be used to collect dust generated by cutting or polishing in real time to keep a workbench clean, or reduce dust scatter during a polishing machine or a cutting tool operation. Usually dust collectors turn on with the turn on of polishing machines and turn off with the turn off of polishing machines. A detection module detects a speed or current of the polishing machine to judge whether the polishing machine is turned on during polishing machine operation, the detection module transmits a detected signal to a central control module, and then the central control module activates the dust collector via an electronic switch. The detection module continuously detects working states of the polishing machine to judge whether the polishing machine is in a continuous working state when the polishing machine operates, if polishing machine is in a continuous working state, then the dust collector is opened continuously to keep collecting dust generated by the polishing machine. The detection module detects a stop working state and sends the stop signal to the central control module when the polishing machine stops working, then central control module turns off the dust collector via an electronic switch. Linkage of the polishing machine and the dust collector can be in a variety of ways, for example, polishing machine connected to dust collector via a power supply interface which is set on the dust collector, so that the detection module detects a current of the power supply interface to judge whether the polishing machine is in a power on state, a running state or a shutdown state, and controls start, run, or stop of the vacuum cleaner synchronously. Also, the detection module and the central control module can be integrated on a power supply interface, so that the detection module can detect current conversion of one or more power supply interfaces and control power supply of another power supply interface synchronously. For example, plugging the polishing machine into one power supply interface, and plugging the dust collector into another power supply interface so that the detection module detects a current change of the power supply interface when the polishing machine is operating and sends the signal to the center control module, the center control module then open the power supply interface to which the dust collector is plugged in via an electronic switch, and at the same time, the dust collector starts running, wherein the detection module constantly detects a current of the polishing machine to ensure that it is in a working state during its operation. In the same way, the central control module will shut down the power supply interface to which the dust collector is plugged in to stop its operation when the detection module detects that the polishing machine stops running.

Also, for example, Chinese Patent Application Number CN200520073478.3 discloses an electric tool synchronizer, in which a dust collector can be started with the start of an electric tool which is powered by a power supply interface provided on the dust collector. The patent also discloses an embodiment that is powered by a unified power receiving interface.

In the process of actual use of the above technical scheme, the dust collector usually runs at a substantially constant power, in order to ensure that there is sufficient suction to suck away dust generated by the polishing machine, so the power of dust collector is usually greater than power for which actual suction is required, even if dust generated by the polishing machine is less, the dust collector still runs at a large power. This will cause unnecessary waste of energy, meanwhile the dust collector at a high-power running state will cause a lot of noise. In addition, dust generated by the machines will be reduced when the polishing machine or other dust-producing machines encounter greater resistance or come close to stall; but at this time, the polishing machine or other dust-producing machine's power is great, while the dust collector still runs at a higher speed and its power is greater, and the total power of the polishing machine and the dust collector may exceed a maximum power which the power supply device can withstand. This may result in overload protection of the power supply device. In order to reduce waste of electricity and noise when dust generated by auxiliary tool is less, it also prevents the total power of the dust collector and the polishing machine overload when the polishing machine or other dust-producing machine is stalled.

SUMMARY

In order to solve the above problems, the present disclosure provides an electric tool coordination system comprising a main tool and an auxiliary tool, the main tool and the auxiliary tool coordinate for working.

A central control module is used to receive load parameters which are generated by the main tool and the auxiliary tool when they operating, and adjust power of the auxiliary tool.

A load parameter detection module is used to detect load parameters generated by the main tool and the auxiliary tool when they operating, and send the load parameters to a central control module.

The central control module increases the power of the auxiliary tool when the load parameter of the main tool received by the central control module increases.

The central control module decreases the power of the auxiliary tool when the load parameter of the main tool received by the central control module decreases.

Preferably, the load detection module can detect a current, voltage or power parameters of the main tool and the auxiliary tool when they are working, and then send the parameters to the central control module; the central control module adjusts output power of the auxiliary tool according to the parameter's value to make power of the auxiliary tool increase as the value of the main tool current, voltage or power increases and decrease as the value of the main tool current, voltage or power decreases.

Preferably, the auxiliary tool provides a power supply interface. The central control module can be integrated selectively on a main tool or an auxiliary tool. The load parameter detection module can be integrated selectively on a main tool or an auxiliary tool.

Preferably, the load parameter detection module and the central control module can communicate in a wired or wireless mode.

Preferably, the system also comprises a common power supply interface which be connected to the main tool and the auxiliary tool. The central control module can be integrated selectively on a power supply interface or an auxiliary tool. The load parameter detection module can be integrated selectively on a power supply interface or the main tool or the auxiliary tool.

Preferably, the main tool is an electric tool capable of producing scraps during operation, and the auxiliary tool is a dust collector.

In order to solve the above technical problems, the present disclosure also provides a combined electric tool coordination method comprising a main tool and a auxiliary tool, the main tool and the auxiliary tool coordinate for working.

A load parameter detection module detects load parameters generated by the main tool and the auxiliary tool when they operating, and sends the load parameters to a central control module. Control flow of the central control module comprises following steps:

The load parameter detection module detects load parameters of the main tool and the auxiliary tool;

The load parameters are sent to the central control module;

The central control module increases power of the auxiliary tool when the load parameters of the main tool increases; and The central control module decreases power of the auxiliary tool when the load parameters of main tool decrease.

Preferably, the load parameters comprise one or more of current, voltage, and power.

Preferably, the central control module performs the following steps before adjusting the power auxiliary tool:

Judging whether total load parameter of the main tool and the auxiliary tool is greater than a predetermined threshold; and Performing a step of reducing or not adjusting the auxiliary tool when the total load parameter is greater than or equal to a predetermined threshold.

The following steps will be performed when the total load parameter is less than a predetermined threshold:

The central control module increases the power of the auxiliary tools when load parameters of the main tool increase; and The central control module decreases the power of the auxiliary tools when load parameters of the main tool decrease.

Compared to existing technology, the electric tool coordination system provided by the present disclosure can adjust the power of the auxiliary tool automatically according to the power of the main tool, the power of the auxiliary tool increases as power of the main tool increases and decreases as the power of the main tool decreases. Relative to existing systems, auxiliary tools do not always run at a high power, instead, they increase or decrease the power according to the needs of the main tool, to thereby improve energy consumption and reduce noise.

DETAILED DESCRIPTION OF THE PREFERRED EMBODIMENTS

Figure 1:
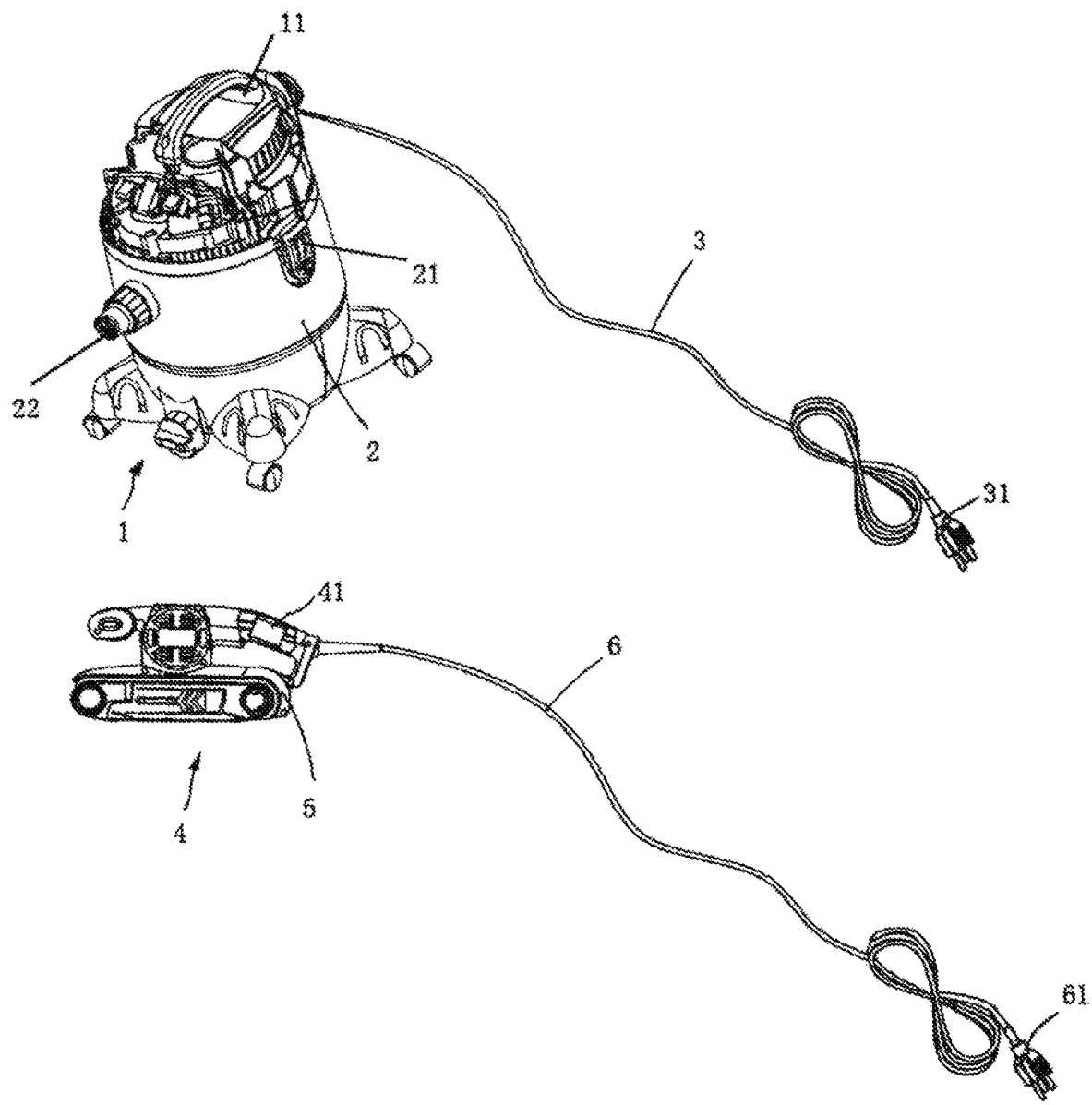
FIG. 1 is a schematic drawing of a main tool and an auxiliary tool of the present disclosure.

The following is nonrestrictive detailed description of the technical proposal of the present disclosure in combination with drawings:

Referring to FIG. 1, an electric tool coordination system comprises a main tool 4 and an auxiliary tool 1, main tool 4 in the present invention is a conventional electric polishing machine, and auxiliary tool 1 is a dust collector 1 which coordinates with a polishing machine 4. Polishing machine 4 comprises a handle 41, a polishing section 5 and a power supply line 6; the handle 41 comprises a component which can be used for holding and a speed control switch (not shown in figure), the user adjusting the speed of polishing machine according to surface of polishing material. The polishing section rubs against the surface of polishing material and generates scraps when the polishing machine 4 operates. Dust collector 1 comprises a dust barrel power head 11 hose (not shown in figure) and a power supply line, the power head 11 including a motor and an impeller (not shown in figure) for generating vacuum suction, dust entering into dust barrel 2 through a hose (not shown in figure) and a suction inlet 22. In the dust barrel is a filter device (not shown in figure) which filters dust from the dust stream into the dust barrel 2. Polishing machine 4 coordinates work with dust collector 1 during use. Power of the corresponding dust collector 1 also increases, and speed of the motor increases which results that suction also increases when the user increases the rotational speed of polishing machine 4. Power of the dust collector 1 decreases, and suction decreases when the user decreases the rotational speed of polishing machine 4. Therefore, the dust collector can coordinate work well with polishing machine, and increase or decrease the suction of the dust collector according to the amount of scraps.

The dust collector 1 and the polishing machine 4 include comprise: a load detection module E1 (see FIG. 4) which detects load parameters of polishing machine 4 during its operation, and a central control module E2 which controls operating power of the dust collector. The load detection module E1 and the central control module E2 establish a communication connection during operation. Central control module E2 can receive load parameters which are detected by load detection module E1 during the operation of the polishing machine 4 and the dust collector 1. The load parameters can be a power, current, voltage, or speed of polishing machine 4 during it operation. The central control module E2 increases power of the dust collection as the increases of power, current and rotational speed of the above-mentioned polishing machine 4 during operation and, on the contrary, decreases the power of dust collector 1 with the decrease of the load parameters.

Figure 2:
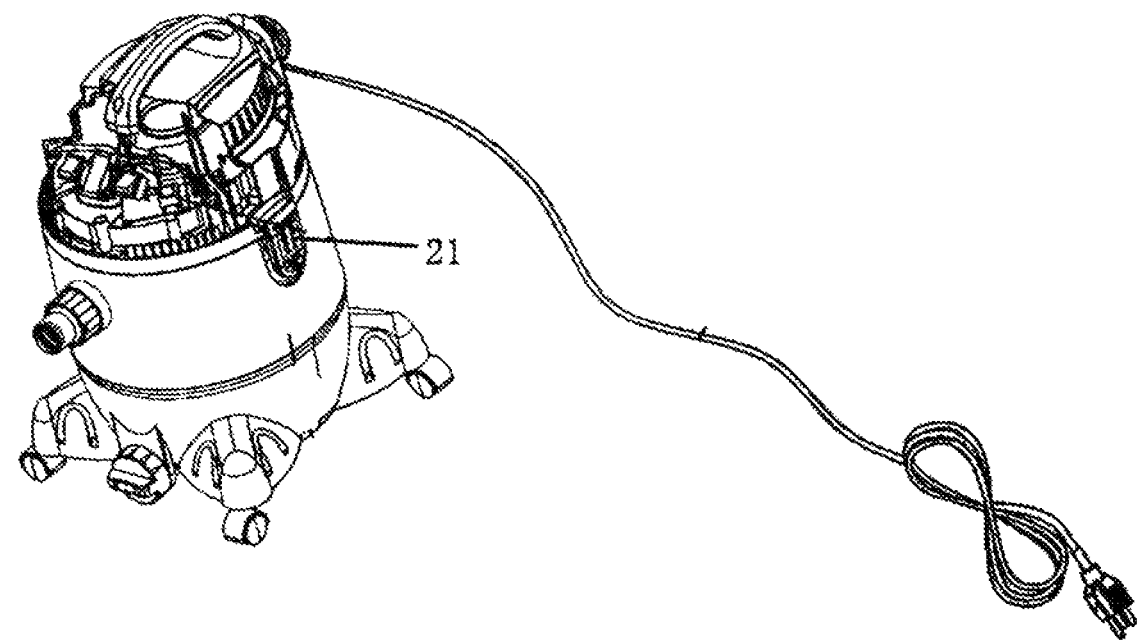
FIG. 2 is a schematic drawing of the present disclosure and the auxiliary tool, wherein a load detection module is integrated on a power supply line of the main tool.
Figure 2:
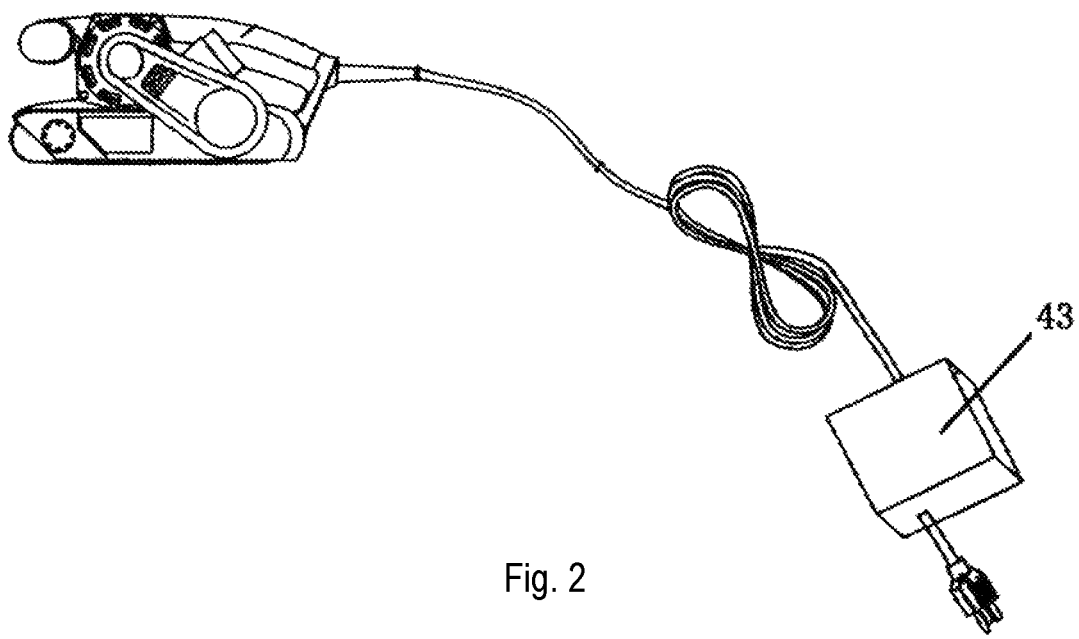
Figure 4:
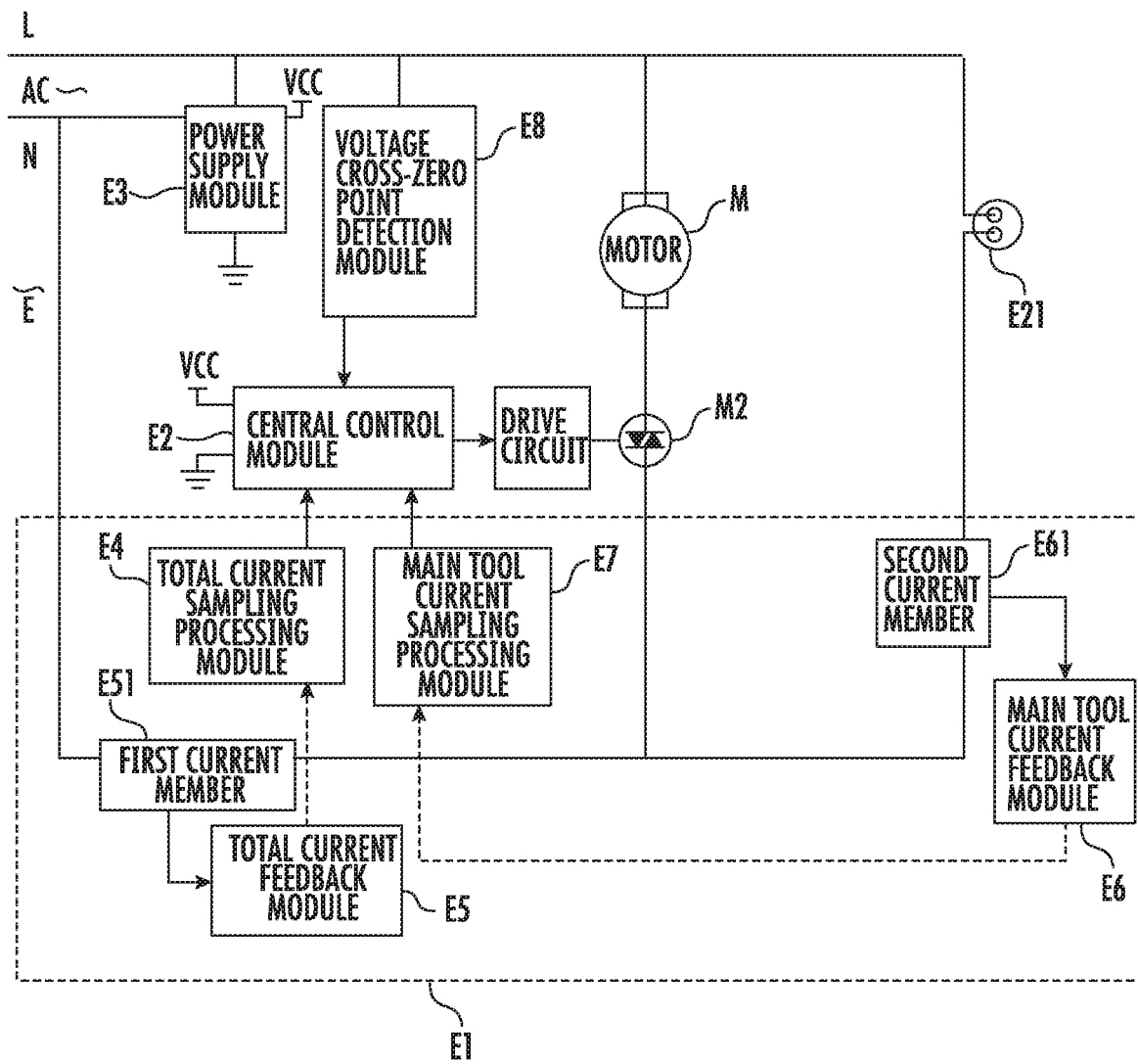
FIG. 4 is a circuit drawing of the present disclosure, wherein the dust collector provides a power supply interface.

Referring to FIG. 1 and FIG. 4, not all of conventional polishing machines are provided with a load detection module E1. Therefore, the present disclosure provides a variation that is well compatible with a conventional polishing machine 4. The dust collector 1 provides at least one power supply interface 21 in which power supply line 6 is inserted, and power supply line 3 of dust collector 1 be is inserted into a home power supply during polishing machine operating. A power supply interface load detection module E1 which is set in the interior of dust collector 1 is electrically connected to the power supply interface 21. As an alternative, the load detection module 43 of the polishing machine can also be integrated on the polishing machine E (see FIG. 2). In the interior of the dust collector 1 is a central control module E2 which electrically connects to load detection module E1. Load parameters generated by the polishing machine 4 can be transferred to central control module E2 in real time via load detection module E1 during polishing machine 4 operation. The central control module adjusts the power of the dust collector according to the detected current or power parameters, that is, adjusts the power of the dust collector to increase as the detected current or power increases, and to decrease as the detected current or power decreases. The power supply interface of the dust collector in addition to powering the main tool, also integrates the control module and the load detection module at the same time, so that it becomes easily compatible with the existing main tool and saves the cost of use.

Figure 3:
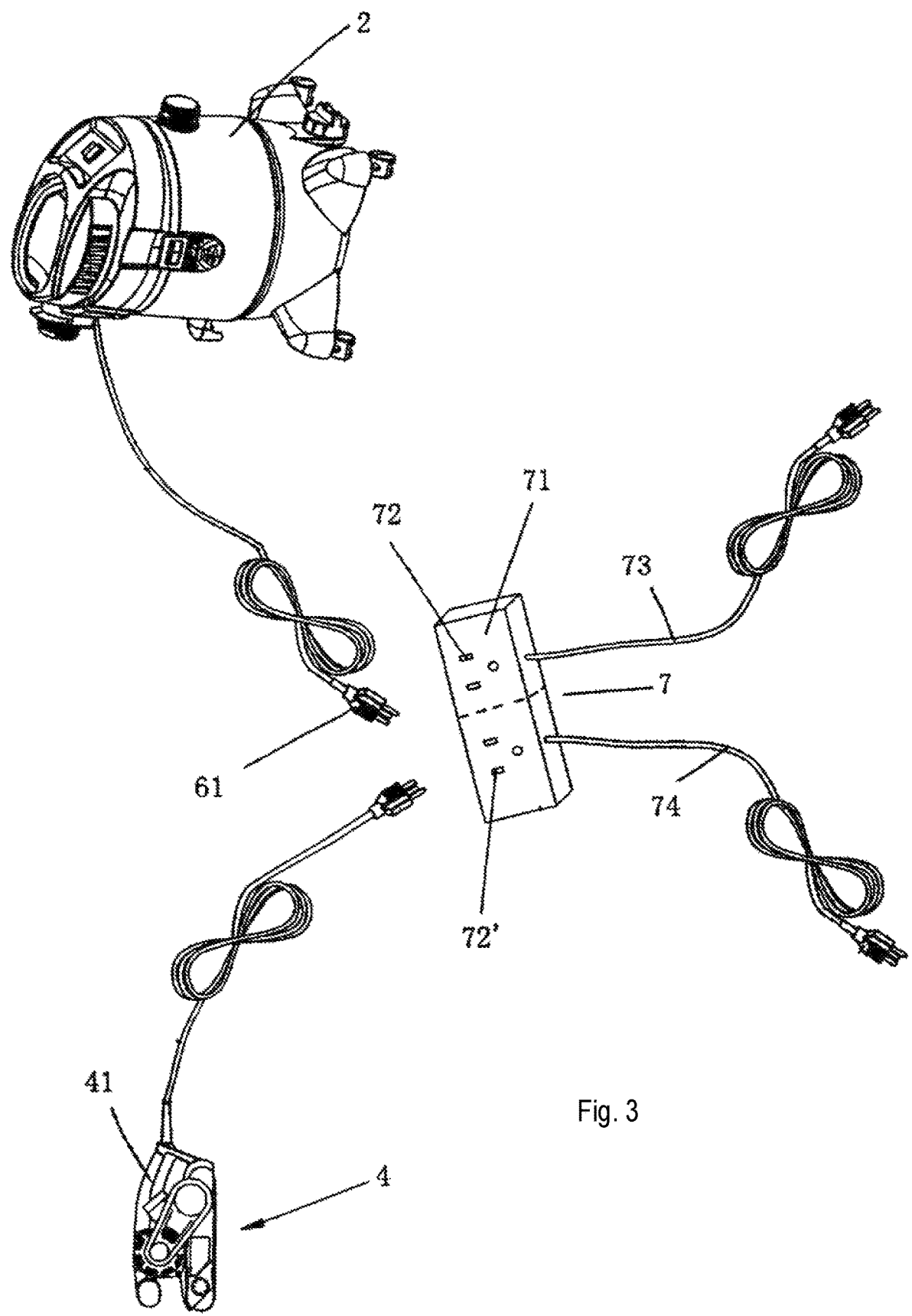
FIG. 3 is a schematic drawing of the main tool, the auxiliary tool and a common power supply interface of the present disclosure.

Referring to FIG. 3, in order to be compatible with an existing electric tool 4 and dust collector 2, a power supply interface 7 can be provided which comprises a socket 71 and a power supply line 74. In order to reduce the load on a single power supply line, a second power supply line 73 can be provided. It is well known to technicians of this field that a single power supply line can be used instead of the second power supply line 73. The socket 71 provides two power supply interfaces, one supplies power to polishing machine 4, the other supplies power to dust collector 1. In the interior of the socket also provides a load detection module E1 and a central control module E2 are provided. The polishing machine power supply interface 72' electrically connects to load detection module E1, and the dust collector 2 power supply interface electrically connects to central control module E2, and the central control module E2 electrically connects to the load detection module E1. The common functional interface 7 not only can supply power to polishing machine 4, but also can be compatible with an existing dust collector which does not have a function of automatically detecting power and adjusting speed and other electric tools when the central control module E2 and the load detection module E1 are integrated inside the common functional interface 7. The user only needs to select a power supply interface which integrates a load detection module E1 and a central control module E2, thereby saving the cost of use.

Referring to FIG. 4, a load detection module E1 can be set in the polishing machine 4 in order to detect load parameters of the polishing machine 4. The load detection module can be set inside of polishing machine 4 or in series with the power supply line of polishing machine 4. The load detection module E1 establishes a communication connection with central control module E2 wirelessly, the load detection module detecting a current voltage or power when the polishing machine operates, as described above. Central control module can be integrated in the socket 71 or dust collector 1.

Referring to FIG. 4, the schematic drawing of dust collector control circuit E includes an AC power supply terminal L, N, a voltage cross-zero point detection module E8, and a circuit board power supply module E3 which converts an alternating current into a direct current which is used by the control circuit. The circuit structure E also comprises a central control module E2 which comprises a control chip and a control program built in the chip. It also comprises a total current sampling processing module E4 which is electrically connected to central control module E2. The total current sampling processing module E4 receives an electric signal fed back by the total current feedback module E5 and generates an electrical signal fed back to the central control module E2, the total current feedback module E5 being electrically connected to a first current sampling module. The current sampling signal reflects the total current of the dust collector and the polishing machine, so that central control module E2 adjusts the power of the dust collector in time according to the current value. Conduction pins of a PID algorithm calculate the motors set in central control module, and send turn on and off signals to drive circuit M1 to control thyristor M2. The technical solution is well known to the technicians in this field of how to control the speed of motor. Also connected to central control module E2 is a main tool current sampling processing module E7 which processes the signal generated by main tool current feedback module E6. Main tool current feedback module E6 is electrically connected to second current sampling element E61. Total current sampling processing module E4 and main tool current sampling processing module E7 can communicate with total current feedback module E5 and main tool current feedback module E6 in a wired or wireless manner. It is well known to the technicians in this field that wireless communication connections comprise a variety of modes such as infrared communication, bluetooth communication, WiFi communication, radio frequency communication, etc.

The central control module E2 is electrically connected to the drive circuit M1 of motor M, and the drive circuit M1 controls a thyristor M2 which controls the on/off status of the power supply of motor M of the dust collector. The central control module, which is well known to the technicians in this field, controls the rotational speed of motor via the on and off status of thyristor M2, thereby increasing or decreasing the operating power of the dust collector to accommodate the operation of external electric tools.

Figure 5:
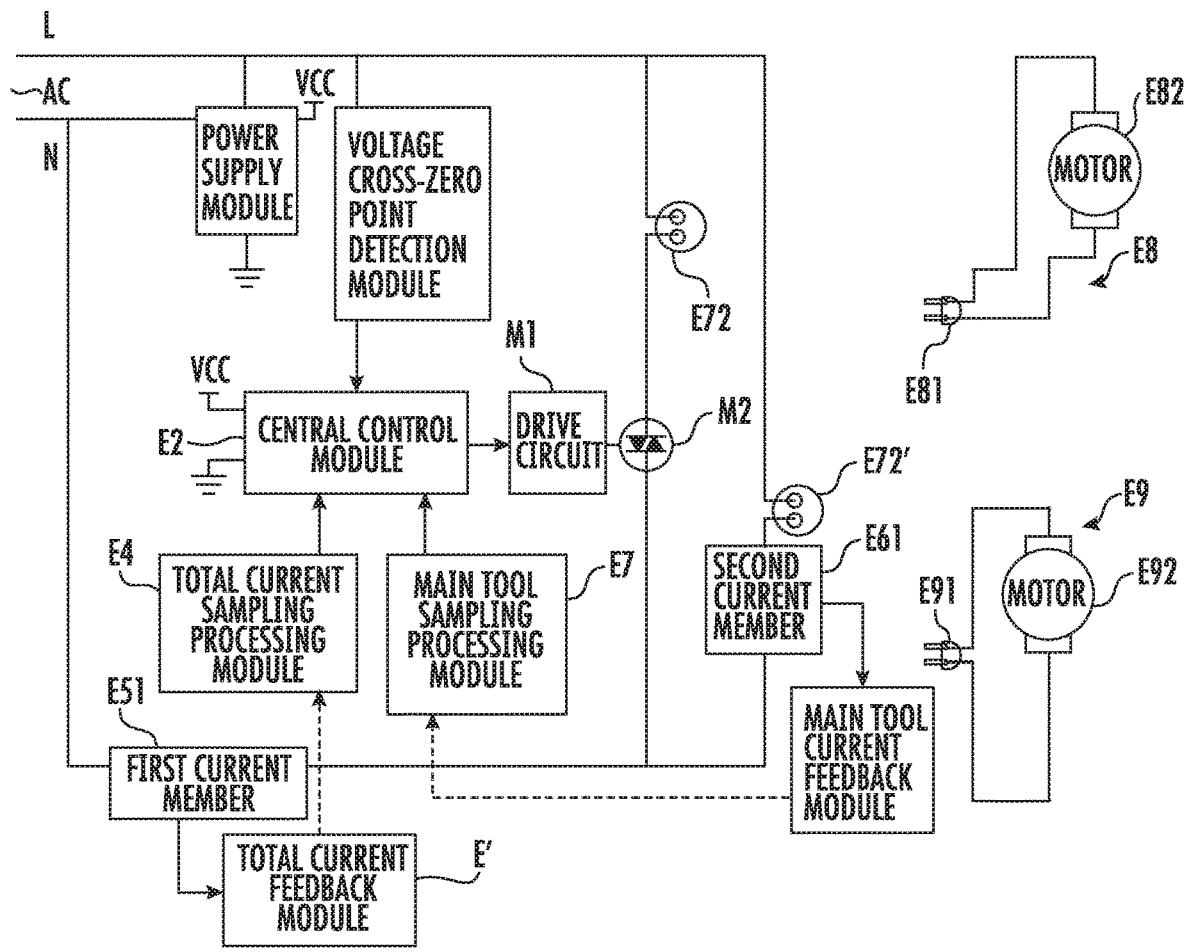
FIG. 5 is a schematic drawing of circuit structure of the present invention use a common power supply interface.

Referring to FIG. 5, it shows a circuit diagram E' of the socket in the electric tool coordination system shown in FIG. 3, including an insertion port E72 of the dust collector, and an insertion port E72' of polishing machine 4. In order to simply describe the circuit structure E' of dust collector, only the circuit of the motor need be drawn, and other circuits such as a safety protection circuit and a working status display circuit should be included in the design process. Similarly, the circuit structure E9 of the main electric tool also only shows the circuit diagram of the motor. The plug of the dust collector is plugged into insertion port E72 of the dust collector, and the plug of main tool is plugged into the insertion port E72' of the main tool when the electric tool coordination system works. In the socket is a central control module E2 which is electrically connected to a total current sampling processing module E4 and a main tool current sampling processing module E7, and it is also electrically connected to a drive circuit M1. Central control module E2 controls the power on and off of the insertion port E72 of dust collector via thyristor M2. In the central control module E2 are conduction pins of a PID algorithm for calculating the thyristor M2. It is well known to the technicians in this field that the PID algorithm can calculate different conduction pins according to different power requirements of the motor to increase or decrease the rotational speed of motor E82. Total current generated by both the polishing machine and the dust collector is detected by the first current member E51 when the polishing machine and the dust collector operate, and second current member E61 detects the current of the main tool when the polishing machine operates. The current detected by second current member E61 increases when user increases the speed of the motor E92 of main tool. Central control module E2 receives the signal that the current of main tool E9 has increased, and calculates the conduction pins of thyristor M2 according to a PID algorithm and increases the operating power of dust collector 1. On the contrary, the current detected by second current member E61 decreases when the speed of the motor E92 of main tool decreases. Central control module E2 calculates the conduction pins of thyristor M2 and decreases the operating power of the dust collector according to the PID algorithm. With the motor of the main tool in a high speed, more dust and scraps are generated. At this time, power of the dust collector increases and suction of the dust collector increases to adapt the speed of scraps generated and clean up timely. When the speed of external tool decreases, fewer scraps are generated. At this time, power of the dust collector decreases to meet the need to clean up scraps, the decreasing of the power of dust collector, being done so that energy consumption decreases and noise decreases.

Figure 6:
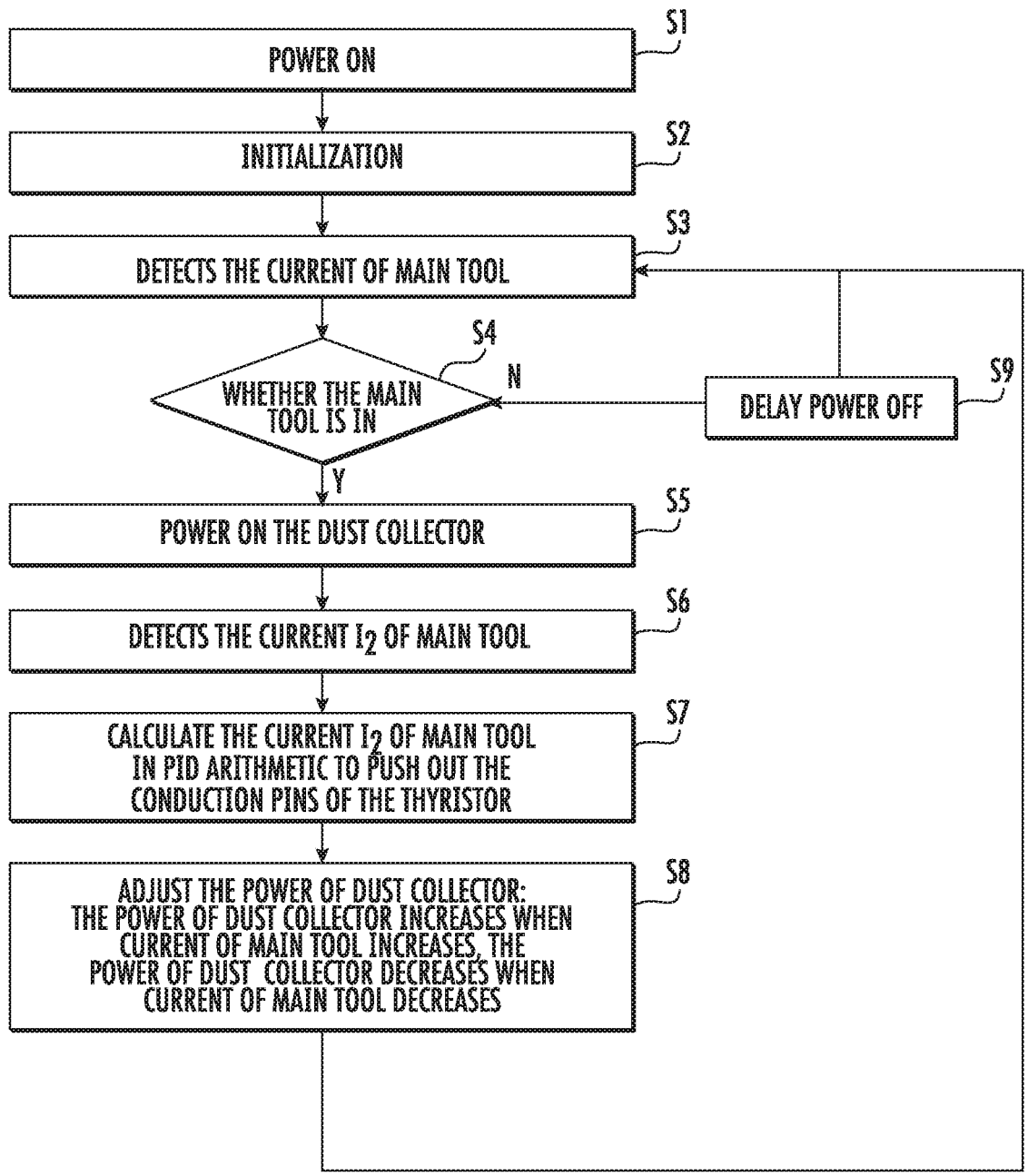
FIG. 6 is a flow chart of synergistic action when dust collector and polishing machine of the present disclosure are operating.

Referring to FIG. 6, a flow chart of an electric tool coordination system comprises the following steps: power-on step S1, initialization step S2 comprises detecting the states and operating parameters of the electric tool, detecting whether the main tool is in step S4, if not, the detection result of the main tool is N, then performing delay power off step S9; if the detection result of the main tool is Y, then performing power on the dust collector step S5. After the power on the dust collector step, entering detect the current I2 of main tool step S6, and then entering calculate the current I2 of main tool in PID arithmetic to push out the conduction pins of thyristor step S7, then entering adjust the power of the dust collector step S8 which comprises the steps of increase and decrease the power of the dust collector. The power of the dust collector increases when the current of the main tool increases; the power of the dust collector decreases when the current of the main tool decreases. After the execution of step S8, the flow returns to step S3 to continue to detect the current of the main tool, and then repeats the steps S4 to S8 until the external tool stops, then performs delay power off step S9.

Figure 7:
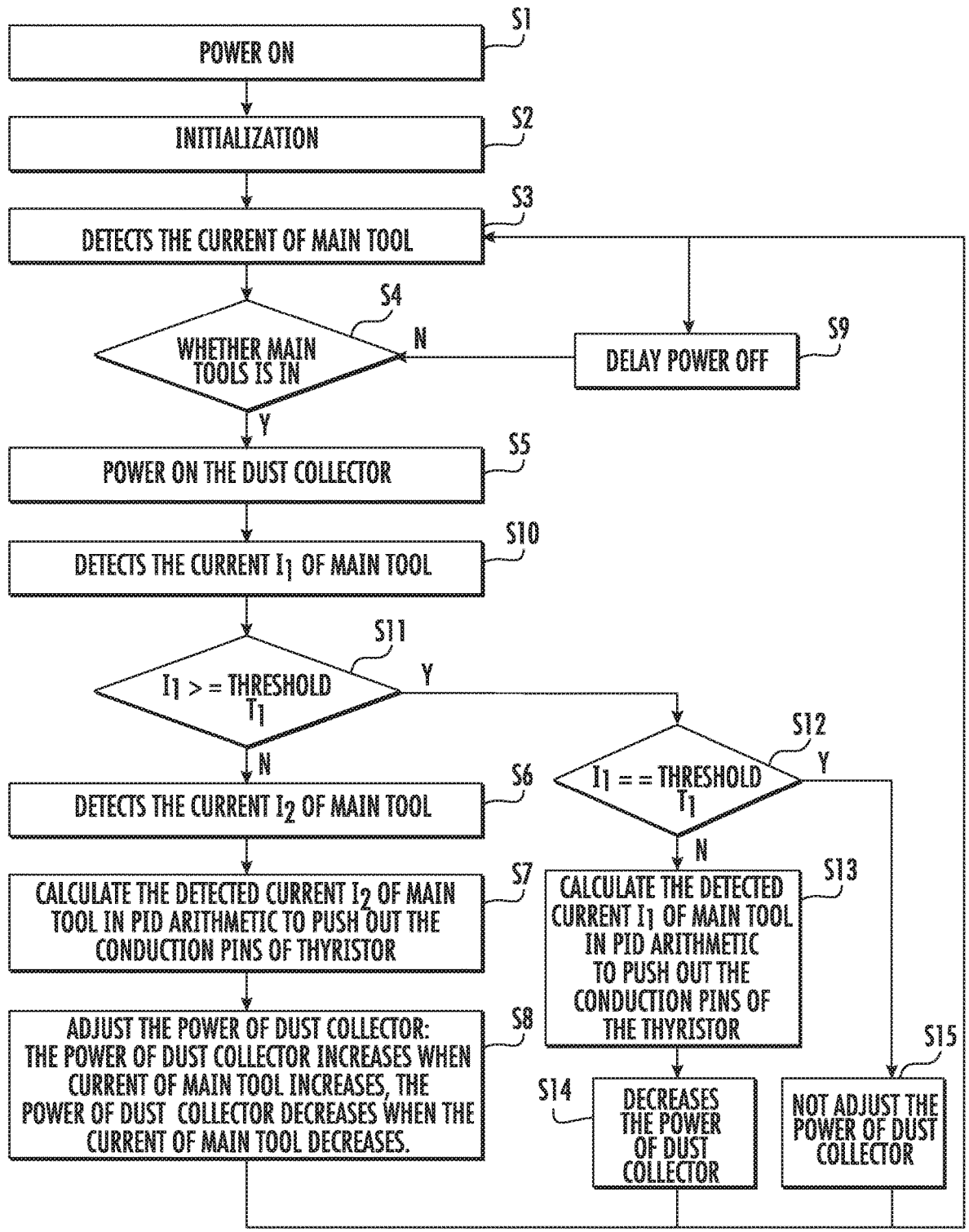
FIG. 7 is a flow chart of synergistic action when another dust collector and polishing machine of the present disclosure are operating.

Referring to FIG. 7, the electric tool flow chart shown in FIG. 6 is further improved. The difference from steps in FIG. 6 is that it adds steps S10 to S15.

The method performs detect total current I2 step after performing power on the dust collector step S5, and then performs judge step S11, judging condition is I>=threshold T1, performs judge step S12 of branch Y when the judge result is tenable. It determines whether total current I1=threshold T2 is tenable, performs not adjust power of dust collector step S15 of branch Y when I1==threshold T2 is tenable, and return to perform detect current of main tool step S3. If I1==threshold T2 is not tenable, it then performs branch N which calculates the detected current of the main tool I2 in PID arithmetic to push out the conduction pins of thyristor step S13, then performs decrease the power of dust collector step S14, and finally return to perform detect current of main tool step S3. If I1>=threshold T1 is not tenable, that is judge result is N, it then performs steps S6, S7, and S8 sequentially in the same manner as S6, S7 and S8 shown in FIG. 6, that is, adjust the power of the dust collector according to change of the current of the main tool, the power of the dust collector increases when the current of the main tool increases, and the power of the dust collector decreases when the current of the main tool current decreases. The purpose of the threshold T1 is to prevent the total threshold of the dust collector and the external electric tool from exceeding the rated threshold. When total current exceeds threshold, it then decreases the power of the dust collector to satisfy the demand of power of the external electric tools, that is, the priority is to satisfy the user's ongoing work tasks. If the current is equal to the threshold of the dust collector, then it does not adjust the power of dust collector.

In summary, the electric tool coordination system is provided by the present disclosure, in which the auxiliary tool can adjust automatically according to the change of the power of the main tool, the power of the auxiliary tool increases when the power of the main tool increases, and the power of the auxiliary tool decreases similarly when the power of the main tool decreases, the characteristic of the automatic adjustment is particularly applicable to using a dust collector as the auxiliary tool. When the power of the main tool (such as a polishing machine) increases, more dust or scraps are generated. At this time, the power of the dust collector automatically decreases, then is adjusted to be higher, and the demand of a large quantity of dust is satisfied, and when the power of the main tool decreases, less dust or scraps are generated, the power of the dust collector automatically decreases, the suction is reduced, and the demand of a small quantity of dust is satisfied. Compared with an existing dust collector with a single gear or power approach, the scheme reduces the noise of the vacuum, and reduces the energy consumption of the dust collector.

The invention claimed is:

1. A combined electric tool coordination system comprising:
one main tool and an auxiliary tool, the main tool and the auxiliary tool operating in coordination, the main tool being an electric tool capable of producing scraps during operation, the auxiliary tool being a vacuum cleaner for vacuuming the scraps produced by the electric tool;
a central control module used to receive load parameters generated by the main tool and the auxiliary tool when operating, and to adjust an output power and a suction of the auxiliary tool;
a load parameter detection module detecting at least one load parameter generated by the main tool and the auxiliary tool when operating, and sending the at least one load parameter detected by the load parameter detection module to the central control module;
wherein, during operation of the main tool, the central control module increases the output power of the auxiliary tool and increases the suction of the auxiliary tool if the at least one load parameter of the main tool received by the central control module increases;
wherein, during operation of the main tool, the central control module decreases the output power of the auxiliary tool and decreases the suction of the auxiliary tool if the at least one load parameter of the main tool received by the central control module decreases; and
wherein the central control module performs the following steps before adjusting the output power of the auxiliary tool:

judging whether a total of the load parameters of the main tool and the load parameters of the auxiliary tool is greater than a predetermined threshold; and when the total is greater than or equal to the predetermined threshold selectively reducing the output power to the auxiliary tool; and when the total is less than the predetermined threshold performing the following steps:
increasing via the central control module the output power of the auxiliary tool when the load parameters of the main tool increase; and
decreasing via the central control module the output power of the auxiliary when the load parameters of the main tool decrease.

2. The combined electric tool coordination system according to claim 1, wherein the at least one load parameter includes at least one of current, voltage or power of the main tool and the auxiliary tool when operating and the central control module adjusts the output power of the auxiliary tool according to a value of the at least one load parameter to make a value of the output power of the auxiliary tool increase or decrease respectively as a value of main tool current, voltage or power increases or decreases.

3. The combined electric tool coordination system according to claim 1, wherein the auxiliary tool includes a power supply interface, the central control module can be integrated selectively on the main tool or the auxiliary tool, and the load parameter detection module can be integrated selectively on the main tool or the auxiliary tool.

4. The combined electric tool coordination system according to claim 3, wherein the load parameter detection module and the central control module can communicate in one of a wired mode or a wireless mode.

5. The combined electric tool coordination system according to claim 3, wherein the system also comprises a common power supply interface connected to the main tool and the auxiliary tool, the central control module being integrated selectively on one of the common power supply interface or the auxiliary tool, the load parameter detection module being integrated selectively on one of the common power supply interface, the main tool, or the auxiliary tool.

6. A combined electric tool coordination method using a main tool and an auxiliary tool, the main tool and the auxiliary tool operating in coordination, the main tool being an electric tool capable of producing scraps during operation, the auxiliary tool being a vacuum cleaner for vacuuming the scraps produced by the electric tool, a load parameter detection module which detects load parameters generated by the main tool and the auxiliary tool when operating, and which sends the load parameters detected to a central control module, the method comprising the following steps:
starting the main tool and the auxiliary tool;
operating the main tool and the auxiliary tool after the starting step;
detecting via the load parameter detection module the load parameters of the main tool and the auxiliary tool during the operating step;
sending the load parameters to the central control module during the operating step;
increasing via the central control module an output power of the auxiliary tool and increasing a suction of the auxiliary tool when the load parameters of the main tool increase during the operating step;
decreasing via the central control module the output power of the auxiliary tool and decreasing the suction of the auxiliary tool when the load parameters of the main tool decrease during the operating step; and
wherein the central control module performs the following steps before adjusting the output power of the auxiliary tool:
judging whether a total of the load parameters of the main tool and the load parameters of the auxiliary tool is greater than a predetermined threshold; and
when the total is greater than or equal to the predetermined threshold selectively reducing the output power to the auxiliary tool; and
when the total is less than the predetermined threshold performing the following steps:
increasing via the central control module the output power of the auxiliary tool when the load parameters of the main tool increase; and
decreasing via the central control module the output power of the auxiliary when the load parameters of the main tool decrease.

7. The combined electric tool coordination method according to claim 6, wherein the load parameters comprise one or more of current, voltage, and power.

* * * * *